US012097521B2

(12) United States Patent
Zezinka et al.

(10) Patent No.: US 12,097,521 B2
(45) Date of Patent: Sep. 24, 2024

(54) APPARATUS AND METHOD FOR PRECISION COATING OF OPHTHALMIC LENSES WITH PHOTOCHROMIC COATINGS

(71) Applicant: Transitions Optical, Ltd., Tuam (IE)

(72) Inventors: Elizabeth Ann Zezinka, Cranberry Township, PA (US); Cathy Ann Taylor, Allison Park, PA (US); Michael Frank Haley, Glenshaw, PA (US); Brian Smyth, Tuam (IE); Anil Kumar, Murrysville, PA (US); David J. Park, Tuam (IE); David B. Knowles, Apollo, PA (US)

(73) Assignee: Transitions Optical, Ltd., Tuam (IE)

( * ) Notice: Subject to any disclaimer, the term of this patent is extended or adjusted under 35 U.S.C. 154(b) by 0 days.

(21) Appl. No.: 16/316,429

(22) PCT Filed: Jul. 15, 2016

(86) PCT No.: PCT/EP2016/066894
§ 371 (c)(1),
(2) Date: Jan. 9, 2019

(87) PCT Pub. No.: WO2018/010809
PCT Pub. Date: Jan. 18, 2018

(65) Prior Publication Data
US 2019/0291128 A1    Sep. 26, 2019

(51) Int. Cl.
*B29D 11/00* (2006.01)
*B05B 12/00* (2018.01)
(Continued)

(52) U.S. Cl.
CPC ............ *B05B 17/063* (2013.01); *B05B 12/00* (2013.01); *B05B 12/14* (2013.01);
(Continued)

(58) Field of Classification Search
CPC ... B05B 17/06; B05B 17/0623; B05B 17/063; B05D 1/02; B05D 1/12; G02B 1/14; G02B 1/10; G02B 5/23; G02C 7/102
See application file for complete search history.

(56) References Cited

U.S. PATENT DOCUMENTS

| 4,731,264 A | 3/1988 | Lin et al. |
| 4,756,973 A | 7/1988 | Sakagami et al. |

(Continued)

FOREIGN PATENT DOCUMENTS

| CN | 1478608 A | 3/2004 |
| CN | 101160180 A | 4/2008 |

(Continued)

*Primary Examiner* — Michael P Wieczorek
(74) *Attorney, Agent, or Firm* — The Webb Law Firm

(57) ABSTRACT

A method of manufacturing an optical article (10) includes supplying a first coating composition (A) and supplying one or more additional coating compositions (B) to an ultrasonic discharge nozzle (102) of a coating apparatus (100). At least one of the first coating composition (A) and the one or more additional coating compositions (B) is a photochromic coating composition. The method includes mixing the first coating composition and the one or more additional coating compositions at the ultrasonic discharge nozzle (102) of the coating apparatus (100), and applying the mixture (C) of the first coating composition (A) and the one or more additional coating compositions (B) to at least a portion of the optical article (10) so as to provide a pattern (24) on the optical article upon exposure to actinic radiation. The mixture (C) of the first coating composition (A) and the one or more additional coating compositions (B) is applied from the ultrasonic discharge nozzle (102) as a controlled, predetermined pattern of atomized droplets.

9 Claims, 4 Drawing Sheets

(51) Int. Cl.
    *B05B 12/14*     (2006.01)
    *B05B 17/06*     (2006.01)
    *B05D 1/12*     (2006.01)
    *G02B 5/23*     (2006.01)
    *G02C 7/10*     (2006.01)
    *G02B 1/10*     (2015.01)

(52) U.S. Cl.
    CPC ............ B05B 12/1418 (2013.01); B05D 1/12 (2013.01); B29D 11/00653 (2013.01); B29D 11/00923 (2013.01); G02B 5/23 (2013.01); G02C 7/102 (2013.01); *G02B 1/10* (2013.01)

(56) References Cited

U.S. PATENT DOCUMENTS

| | | | |
|---|---|---|---|
| 5,134,191 A | 7/1992 | Takarada et al. | |
| 5,231,156 A | 7/1993 | Lin | |
| 5,405,958 A * | 4/1995 | VanGemert | C07D 498/10 351/159.02 |
| 5,462,806 A | 10/1995 | Konishi et al. | |
| 5,645,767 A | 7/1997 | Van Gemert | |
| 5,658,501 A | 8/1997 | Kumar et al. | |
| 5,962,617 A | 10/1999 | Slagel | |
| 6,113,814 A | 9/2000 | Gemert et al. | |
| 6,296,785 B1 | 10/2001 | Nelson et al. | |
| 6,773,108 B2 * | 8/2004 | deRojas | C08G 18/12 351/159.57 |
| 6,824,071 B1 | 11/2004 | McMichael | |
| 7,250,190 B2 | 7/2007 | Sakurada et al. | |
| 7,258,437 B2 | 8/2007 | King et al. | |
| 7,452,611 B2 | 11/2008 | Blackburn et al. | |
| 7,757,629 B2 | 7/2010 | Lydon et al. | |
| 7,929,220 B2 * | 4/2011 | Sayag | G02B 5/005 359/241 |
| 8,272,579 B2 * | 9/2012 | King | B01L 3/0268 239/290 |
| 8,608,988 B2 | 12/2013 | Bowles et al. | |
| 9,023,424 B2 | 5/2015 | Otani et al. | |
| 9,101,949 B2 * | 8/2015 | Babaev | B01F 3/08 |
| 2003/0157263 A1 | 8/2003 | Walters et al. | |
| 2005/0082391 A1 | 4/2005 | Mellentine et al. | |
| 2006/0078691 A1 | 4/2006 | Cherif et al. | |
| 2007/0051307 A1 * | 3/2007 | Babaev | B05B 17/0623 118/620 |
| 2007/0052922 A1 | 3/2007 | King et al. | |
| 2007/0128343 A1 | 6/2007 | Chappa | |
| 2007/0264426 A1 | 11/2007 | Mosse | |
| 2008/0187760 A1 * | 8/2008 | Wiand | B29D 11/00317 428/412 |
| 2009/0032612 A1 | 2/2009 | Kunstmann et al. | |
| 2012/0120473 A1 | 5/2012 | Kumar et al. | |
| 2013/0029032 A1 | 1/2013 | King et al. | |
| 2015/0231839 A1 | 8/2015 | Su et al. | |
| 2016/0038972 A1 | 2/2016 | Lu | |

FOREIGN PATENT DOCUMENTS

| | | |
|---|---|---|
| CN | 101300507 A | 11/2008 |
| CN | 101479631 A | 7/2009 |
| JP | 8215616 A | 8/1996 |
| WO | 9420581 A1 | 9/1994 |

\* cited by examiner

APPARATUS AND METHOD FOR PRECISION COATING OF OPHTHALMIC LENSES WITH PHOTOCHROMIC COATINGS

CROSS-REFERENCE TO RELATED APPLICATION

This application is the United States national phase of International Application No. PCT/EP2016/066894 filed Jul. 15, 2016, the disclosure of which is hereby incorporated in its entirety by reference.

FIELD OF THE INVENTION

The present invention relates to a method of manufacturing an optical article, such as an optical lens, that involves coating the optical article with a mixture of a first coating composition and one or more additional coating compositions on at least a portion of the optical article in a controlled, predetermined pattern of atomized droplets. The present invention also relates to an optical article having such a coating.

DESCRIPTION OF THE RELATED ART

With optical articles, such as ophthalmic lenses, one or more surfaces may be subjected to a treatment to enhance the overall performance and function of the optical articles. Examples of such treatments include the formation of one or more coatings on a surface of an optical substrate, such as a primer coating, a hard coating, a photochromic coating, and/or an antireflection coating.

It is known in the art to prepare light-transmissible optical articles from a polymeric material where the optical article includes a photochromic dye. It is also known in the art to provide gradient coating for use in coloring optical articles, such as lenses. The gradient tinting effect provides a functional advantage in that the lens generally has a higher color density at a first portion of the lens, such as a top portion of the lens, for improved distance viewing with less color density at a second portion of the lens, such as a bottom of the lens. The gradient tinting effect also adds an aesthetic effect for fashion and style.

The one or more coatings may be applied on a surface of the optical substrate using a number of different techniques. In some examples, the optical substrate may be immersed into a liquid. After the optical substrate is pulled out of the liquid, the liquid forms a coating layer on the immersed surface(s) of the optical substrate. In other examples, liquid coating is deposited onto a surface of the optical substrate, which is then rotated at high speed to spread the coating into a thin film covering the surface of the optical substrate. In various examples, the one or more coatings may be heated or exposed to radiation, such as ultraviolet radiation, to cure the coating.

In general, application of coatings on optical articles requires precise control of film thickness in order to assure uniform appearance and performance. Various methods are known to achieve a gradient photochromic coating on an optical article. Generally, gradient tinting of eyewear lenses is accomplished by dipping or submerging the lens into a dye bath. This process requires more precise and reproducible processing than is required for solid tinting or coloring. Moreover, some optical substrates, such as polycarbonate lens material, absorb dyes very poorly. While methods have been developed to overcome these processing difficulties, such methods often require additional manufacturing steps, thus adding additional manufacturing costs.

It would be desirable to develop new methods of producing optical articles using coating methods that produce a precise film thickness on an optical substrate. It would be further desirable to provide a cost-effective method of preparing a gradient photochromic optical element where a light-absorbing composition can be applied to the optical article in a controlled and predetermined gradient pattern to the surface of the optical article in order to create a gradient pattern upon exposure of the optical article to actinic radiation.

SUMMARY OF THE INVENTION

In accordance with some examples, a method of manufacturing an optical article may include supplying a first coating composition to an ultrasonic discharge nozzle of a coating apparatus and supplying one or more additional coating compositions to the ultrasonic discharge nozzle of the coating apparatus. At least one of the first coating composition and the one or more additional coating compositions may be a photochromic coating composition. The method may further include mixing the first coating composition and the one or more additional coating compositions at the ultrasonic discharge nozzle of the coating apparatus and applying the mixture of the first coating composition and the one or more additional coating compositions to at least a portion of the optical article so as to provide a pattern on the optical article upon exposure to actinic radiation. The mixture of the first coating composition and the one or more additional coating compositions may be applied from the ultrasonic discharge nozzle as a controlled, predetermined pattern of atomized droplets.

In accordance with other examples, the pattern may be a gradient pattern. The gradient pattern may be linear, curvilinear, radial, or a combination thereof. The gradient pattern may be formed by controlling a flow rate of the first coating composition relative to a flow rate of the one or more additional coating compositions. Controlling the flow rate of the first coating composition relative to the flow rate of the one or more additional coating compositions may vary a concentration of the photochromic coating composition in the mixture. The gradient pattern may be formed by varying a thickness of the mixture on the optical article. The mixture of the first coating composition and the one or more additional coating compositions may be applied on the optical article as a coating having uniform thickness. The mixture of the first coating composition and the one or more additional coating compositions may be applied on the optical article as a coating having a non-uniform thickness. The mixture of the first coating composition and the one or more additional coating compositions may be applied on the optical article in a single pass or multiple passes. The first coating composition may have one or more first reactive groups selected from isocyanate and epoxy. The one or more additional coating compositions may have a second reactive group selected from the group consisting of hydroxyl, thiol, primary amine, secondary amine, carbamate, and carboxylic acid. The first coating composition may have an isocyanate first reactive group, and the one or more additional coating compositions may have an hydroxyl second reactive group. The optical article may be selected from the group consisting of optical lenses, optical filters, windows, visors, mirrors and displays, preferably optical lenses, more preferably ophthalmic lenses. The ultrasonic discharge nozzle may have a frequency of 48-120 kHz. An optical article may be obtainable by the method described herein.

In accordance with further examples, an apparatus for applying material to an optical article may include a holder for retaining the optical article and an ultrasonic discharge nozzle for mixing a first coating composition and one or more additional coating compositions. The ultrasonic discharge nozzle may be configured for applying an atomized mixture of the first coating composition and the one or more additional coating compositions to at least a portion of the optical article. The apparatus may include means for separately supplying the first coating composition and the one or more additional coating compositions to the ultrasonic discharge nozzle and a controller for positioning at least one of the holder and the ultrasonic discharge nozzle relative to each other prior to applying the atomized mixture to at least a portion of the optical article and to control the coating operation of the ultrasonic discharge nozzle so as to provide a pattern on the optical article upon exposure to actinic radiation. The pattern may be a gradient pattern. The gradient pattern may be linear, curvilinear, radial, or a combination thereof.

These and other features and characteristics of optical articles described herein, as well as the methods of manufacture of such articles, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. As used in the specification and the claims, the singular form of "a", "an", and "the" include plural referents unless the context clearly dictates otherwise.

BRIEF DESCRIPTION OF THE DRAWINGS

In FIGS. 1-6 the same characters represent the same components unless otherwise indicated.

DETAILED DESCRIPTION OF THE INVENTION

Figure 1:
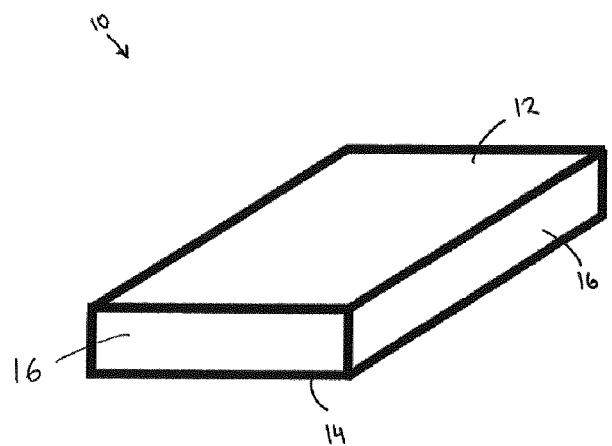
FIG. 1 is a representative perspective view of an optical substrate configured for having one or more coating layers prepared in accordance with a method of the present invention.

As used herein the term "optical" means pertaining to or associated with light and/or vision. For example, according to various non-limiting examples disclosed herein, the optical element, article or device can be chosen from ophthalmic elements, articles, and devices, display elements, articles, and devices, visors, windows, and mirrors.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display elements, articles and devices include screens, and monitors.

As used herein the term "coating" means a supported film derived from a flowable composition, which may or may not have a uniform thickness, and specifically excludes polymeric sheets.

As used herein the term "sheet" means a pre-formed film having a generally uniform thickness and capable of self-support.

As used herein the term "controlled, predetermined pattern" means a pattern formed by a managed and organized deposition of a coating material in preset portions of on a coating surface.

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, the term "photochromic" and similar terms, such as "photochromic compound" and "photochromic coating compound", means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the terms "photochromic compound", "photochromic composition", and "photochromic coating composition" include thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein, the term "reactive group" means an atom or an associated group of atoms in a chemical substance that is intended to or can be reasonably expected to undergo a chemical reaction when exposed to a reactive moiety.

As used herein to modify the term "state," the terms "first" and "second" are not intended to refer to any particular order or chronology, but instead refer to two different conditions or properties. For purposes of non-limiting illustration, the first state and the second state of a photochromic compound of a photochromic layer can differ with respect to at least one optical property, such as but not limited to the absorption of visible and/or UV radiation. Thus, according to various non-limiting examples disclosed herein, the photochromic compound of a photochromic layer can have a different absorption spectrum in each of the first and second state. For example, while not limiting herein, the photochromic compound of a photochromic layer can be clear in the first state and colored in the second state. Alternatively, the photochromic compound of a photochromic layer can have a first color in the first state and a second color in the second state.

As used herein, the term "photosensitive material" means materials that physically or chemically respond to electromagnetic energy, including, but not limited to, phosphorescent materials and fluorescent materials.

As used herein, the term "non-photosensitive materials" means materials that do not physically or chemically respond to electromagnetic energy, including, but not limited to, static dyes.

The term "hue" as used herein means pure color in terms, such as "green", "red", or "magenta", and includes mixtures of two pure colors like "red-yellow" (i.e., "orange"), or "yellow-green". The term "color density" as used herein means, upon exposure to actinic radiation, optical density of an area of the optical element surface printed with the colorant composition. A higher color density results in a lower percent light transmittance. For purposes of this invention, the bottom of the lens is closest to the lens wearer's cheekbone, and the top of the lens is closest to the lens wearer's forehead. This linearly gradient color pattern should be differentiated from radially gradient color patterns known in the art, e.g., those used in connection with lenses, wherein color density varies radially outward from a center point to the outer perimeter of the lens.

As used herein, the term "ultrasonic" refers to one or more sound waves having a frequency higher than approximately 20,000 Hz (20 kHz).

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, spatial or directional terms, such as "left", "right", "up", "down", "inner", "outer", "above", "below", and the like, relate to various features as depicted in the drawing figures. However, it is to be understood that various alternative orientations can be assumed and, accordingly, such terms are not to be considered as limiting.

As used herein, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

Optical Article

In various examples, the present disclosure is generally directed to an optical article 10. The optical article 10 can be selected from ophthalmic articles or elements, display articles or elements, visors, windows, mirrors, active liquid crystal cell articles or elements, and passive liquid crystal cell articles or elements.

With reference to FIG. 1, the optical article 10 has a forward or top surface 12, a rearward or bottom surface 14, and a side surface 16 extending between the top surface 12 and the bottom surface 14. When optical article 10 is an ophthalmic lens, the bottom surface 14 is opposed to the eye of an individual wearing optical article 10, the side surface 16 typically resides within a supportive frame, and the top surface 12 faces incident light (not shown), at least a portion of which passes through optical article 10 and into the individual's eye. With some examples, at least one of the top surface 12, the bottom surface 14, and the side surface 16 may be convex, concave, or planar, or a combination of one or more of convex, concave, and planar surface.

Figure 2:
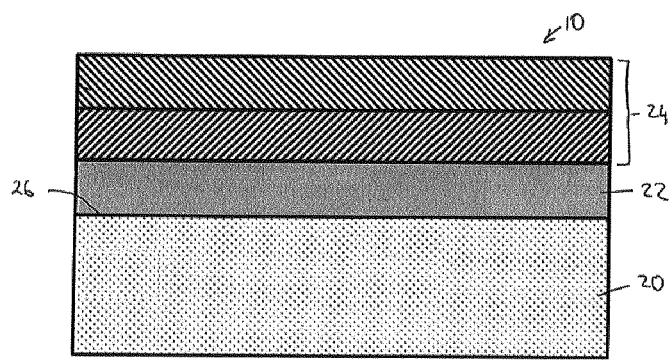
FIG. 2 is a representative cross-sectional side view of an optical article in accordance with one example.

With reference to FIG. 2, the optical article 10 generally includes an optical substrate 20. The optical article 10 further has a first coating layer 22 applied over at least a portion of a surface of the optical article 10, such as at least one of the top surface 12, the bottom surface 14, and the side surface 16. The optical article 10 may optionally include one or more additional coating layers 24 applied over at least a portion of the first coating layer 22. In some examples, the first coating layer 22 and/or the one or more additional coating layers 24 may be a mixture of a first coating composition and one or more additional coating compositions.

In accordance with some examples of the present invention, the optical article 10 has the optical substrate 20 having an exterior surface 26 that generally defines an overall outer physical shape of the optical article 10. The exterior surface 26 of the optical substrate may define at least a portion of the top surface 12, the bottom surface 14, and/or the side surface 16 of the optical article 10 (shown in FIG. 1). In various examples of the present disclosure, at least a portion of the exterior surface 26 of the optical substrate 20 may have a concave surface, a convex surface, or a planar surface, or a combination of one or more of convex, concave, and planar surface. In some examples, various portions of the exterior surface 26 may have a coating layer, such as the first coating layer 22 or one or more additional coating layers 24, applied directly to the exterior surface 26 of the optical substrate 20.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intraocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

The optical substrate 20 may include an inorganic material, an organic polymeric material, and combinations thereof. The optical substrate 20 can, with some examples, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Non-limiting examples of inorganic materials suitable for use in forming the optical substrate 20 of the optical article 10 of the present disclosure include glasses, such as silica based glasses, minerals, ceramics, and metals. For example, in one non-limiting example the optical substrate 20 can include glass.

Non-limiting examples of organic materials that can be used to form the optical substrate 20 of the optical article 10 of the present disclosure, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS; and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

Coating Layers

In accordance with some further examples of the present disclosure, the optical article 10 includes the optical substrate 20 having an exterior surface 26 and a first coating layer 22 applied over at least a portion of the exterior surface 26. The first coating layer 22 may be optically clear (without a color hue), or it may have a desired color hue. The first coating layer 22, with some additional examples, can include a static dye, a photochromic material, or a combination of two or more thereof, as will be discussed in further detail herein.

The method of the present invention further includes forming the first coating layer 22 over at least a portion of the exterior surface 26 of the optical substrate 20. The first coating layer 22 may be formed over the entire exterior surface 26, such as the exterior surface 26 corresponding to the top surface 12 of the optical member 10, with some examples. The first coating layer 22 may be conformal to the exterior surface 26 or it may form a planar surface over the exterior surface 26, as illustrated in FIG. 2. When the first coating layer 22 is conformal to the exterior surface 26, the topography of the exterior surface 26 is maintained on a surface of the first coating layer 22 that is opposite to a surface at the interface between the first coating layer 22 and the exterior surface 26. In various examples, the first coating layer 22 may be applied over at least a portion of the exterior surface 26 of the optical substrate 20 as a mixture of at least two coating compositions using an ultrasonic discharge nozzle of a coating apparatus, as described herein.

In some examples, one or more additional coating layers 24 may be formed over the first coating layer 22. In some examples, the one or more additional coating layers 24 may be formed over an entire surface of the first coating layer 22. The second coating layer 24 may be conformal to the first coating layer 22, or it may form a planar surface over an outer or top surface of the first coating layer 22, as illustrated in FIG. 2. At least one of the first coating layer 22 and the one or more additional coating layers 24 may be applied over at least a portion of the exterior surface 26 of the optical substrate 20 as a mixture of at least two coating compositions using an ultrasonic discharge nozzle of a coating apparatus, as described herein.

The first coating layer 22 and other optional films and/or layers (such as but not limited to the one or more additional coating layers 24) that are formed on or over the optical article 10 each have clarity at least sufficient so as to allow observance of a source of electromagnetic energy through the optical article 10 and a reflection of the electromagnetic energy incident on a surface of the optical article 10. With some examples, the first coating layer 22 and one or more additional layers 24 each independently have a percent transmittance of greater than 0% and less than or equal to 100%, such as from 50% to 100%. With additional examples, the first coating layer 22 and one or more additional coating layers 24 have reflectance at least sufficient so as to allow a reflection of at least a portion of electromagnetic energy incident on the exterior surface of the optical article 10.

Coating Process and Apparatus

As discussed herein, the present invention is directed to a method and apparatus for preparing an optical article which, upon exposure to actinic radiation, has a pattern, such as a linearly gradient pattern, on a surface of the optical article. For purposes of the present invention, a "gradient pattern" is achieved through the deposition of a coating composition, such as a photochromic composition, (via a coating apparatus having an ultrasonic discharge nozzle) onto at least one surface of the optical article 10 in such a way so as to create a gradual, visually discernible variation in hue and/or color density over an area of the optical article 10 when the optical article 10 is exposed to actinic radiation.

Figure 3:
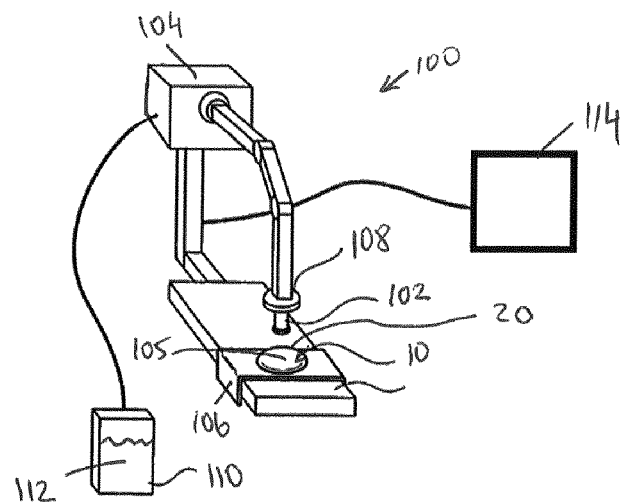
FIG. 3 is a representative perspective view of a coating apparatus for applying one or more coatings on an optical article.

With reference to FIG. 3, the optical article 10 can be made using a coating apparatus 100, such as the coating apparatus 100 having an ultrasonic discharge nozzle 102. The coating apparatus 100 is configured for applying a coating material in the form of extremely fine droplets on a surface, such as one or more surfaces of the optical substrate 20. A discharge apparatus associated with the coating apparatus 100, such as the ultrasonic discharge nozzle 102, has one or more nozzles associated therewith. Each nozzle is configured to controllably discharge a plurality of droplets of the coating material, either continuously or on-demand. A controller may control the size of the drop (volume of coating material) and the speed at which the drop is formed and delivered.

Ultrasonic spray coating (atomization) technology is a process by which high frequency sound waves are utilized to produce an atomized spray liquid. For example, a metal diaphragm vibrating at an ultrasonic frequency may be employed to create atomized liquid droplets. The resultant droplets may be precisely targeted toward a surface to be coated. The ultrasonic discharge nozzle 102 typically operates at a specific resonant frequency, determined primarily by the length of the ultrasonic discharge nozzle 102. Both free ends of the ultrasonic discharge nozzle 102 should be anti-nodes (points of maximum vibrational amplitude). The ultrasonic discharge nozzle 102 produces standing, sinusoidal longitudinal waves such that a critical amplitude is ultimately reached at which the height of the capillary waves exceeds that which is required to maintain their stability. The result is that the capillary waves collapse and drops of liquid are ejected from the tops of the degenerating waves to the atomizing surface of the ultrasonic discharge nozzle 102.

Ultrasonic atomization, as employed according to various examples of the present invention, advantageously has been found to assist in imparting improved process control and precise, uniform thin film coatings for lenses. Existing and known ultrasonic atomizers (e.g., ultrasonic spray devices used in the electronics industry, namely, devices having an ultrasonic discharge nozzle including piezoelectric transducers, ground and active electrodes and an atomizing surface) may be utilized in the present invention. Various types of ultrasonic nozzles may be utilized, e.g., a Sono-Tek™ 48 kHz Impact Style Ultrasonic nozzle Model 06-04-00918-003. The power of the ultrasonic spray is preferably at a setting of 0.5 Watts to 12 Watts for the 48 kHz nozzle and 0.5 Watts to 5.5 Watts for the 120 kHz nozzle. It is to be noted that the power of the ultrasonic spray is a parameter which may be adjusted as necessary depending, e.g., on the density and/or viscosity of coating composition(s) used.

Figure 4:
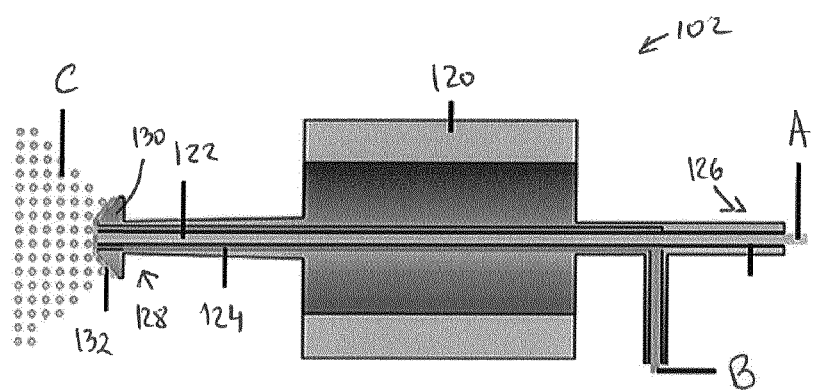
FIG. 4 is a representative cross-sectional side view of a nozzle of the coating apparatus shown in FIG. 3.

With reference to FIG. 4, an exemplary ultrasonic discharge nozzle 102 has a housing 120 with at least one liquid feed channel extending through the housing 120. The housing 120 has a diaphragm (not shown) that vibrates at an ultrasonic frequency to create atomized liquid droplets. In some examples, the housing 120 has a first liquid channel 122 and a second liquid channel 124 extending therethrough. The first liquid channel 122 and the second liquid channel 124 extend substantially parallel to one another through the housing 120. In some examples, the first liquid channel 122 and the second liquid channel 124 may be coaxial such that one of the first liquid channel 122 and the second liquid channel 124 extends through a bore of the other of the first liquid channel 122 and the second liquid channel 124. Each of the first liquid channel 122 and the second liquid channel 124 has a first end 126 opposite a second end 128 along a longitudinal axis. The first end 126 of each of the first liquid channel 122 and the second liquid channel 124 is in fluid communication with a storage reservoir 110 for receiving at least one coating composition. For example, the first end 126 of the first liquid channel 122 may be in fluid communication with a first portion of the storage reservoir 110 to receive a first coating composition A, while the first end 126 of the second liquid channel 124 may be in fluid communication with a second portion of the storage reservoir 110 to receive one or more additional coating compositions B. At least one of the first coating composition A and the one or more additional coating compositions B may be a photochromic coating composition.

With continued reference to FIG. 4, the second end 128 of the first liquid channel 122 and the second liquid channel 124 terminates in a nozzle 130 having an atomizing surface 132. The nozzle 130 has a first outlet 134 for delivering fluid through the first liquid channel 122 and a second outlet 136 for delivering fluid through the second liquid channel 122. In some examples, the first outlet 134 may be configured for delivering the first coating composition through the first liquid channel 122, while the second outlet 136 may be configured for delivering one or more additional coating compositions through the second liquid channel 122. As the first coating composition and the one or more additional coating compositions are delivered to the atomizing surface 132 of the nozzle 130, the coating compositions mix at the nozzle 130 and are atomized by the ultrasonic vibration of the ultrasonic discharge nozzle 102 into an atomized mixture C prior to being deposited on a coating surface of the optical article 10.

In various examples, the one or more ultrasonic discharge nozzles 102 may be controlled to apply uniform or non-uniform thickness of a coated layer in a controlled, predetermined pattern of atomized droplets. For example, the one or more ultrasonic discharge nozzles 102 may apply a coating having a substantially uniform thickness over an entire coating surface of the optical substrate 20. In various examples, a thickness of the coated layer on the coating surface may be from a minimum of 1 µm to a maximum of 40 µm, preferably 5 µm to 25 µm. A density of droplets of the coating material deposited on the coating surface may be between a minimum of 725 droplets-per-inch to a maximum of 1400 droplets-per-inch. In various examples, application quantity may be controlled in various regions of the optical substrate 20 to account for movement of the coating material on a curved surface of the optical substrate 20. For example, on a convex optical substrate 20, the application quantity of the coating material on the radially inner portion of the optical substrate 20 may be higher than an application quantity of the coating material on radially outer portion of the optical substrate 20 in order to form a coating layer having a uniform thickness. Alternatively the nozzle height may be adjusted variably in the Z-axis as the nozzle moves across the face of the lens in order to maintain an equidistant height. In other examples, the coating layer may have a non-uniform thickness on various portions of the optical substrate 20.

With reference to FIG. 3, the coating apparatus 100 includes a housing 104 having a workpiece holder 106 and one or more ultrasonic discharge nozzles 102. In some examples, the workpiece holder 106 may be configured to securely retain the optical article 10 during the coating process. A plurality of optical articles 10 may be secured within the workpiece holder 106. Each optical article 10 is retained within the workpiece holder 106 such that a surface of the optical article 10 to be coated ("the coating surface 105") is facing the one or more ultrasonic discharge nozzles 102. During the coating process, the ultrasonic discharge nozzle 102 is desirably positioned at a predetermined height above the optical article 10, e.g., such that the tip of the ultrasonic discharge nozzle 102 is preferably from about 10 mm to about 60 mm, and preferably about 25 mm to about 45 mm above the coating surface 105. In some examples, a plane of the coating surface 105 may be substantially perpendicular to the downwards direction of a coating spray being ejected from the one or more ultrasonic discharge nozzles 102. In other examples, the plane of the coating surface 105 may be angled relative to a direction of a coating spray being ejected from the one or more ultrasonic discharge nozzles 102 at an angle between about 10 degrees to about 45 degrees, and preferably about 20 degrees to about 30 degrees. In some examples, the workpiece holder 106 may be configured to retain a frame, such as an eyeglass frame, having the optical article 10 mounted therein. A plurality of frames may be secured within the workpiece holder 106.

The workpiece holder 106 may be fixed or movable relative to the ultrasonic discharge nozzle 102. In one example, the workpiece holder 106, along with the optical substrate 20 secured thereto, is held stationary on a base platform 107, while the one or more ultrasonic discharge nozzles 102 are attached on a movable arm 108. In another example, such as shown in FIG. 3, the workpiece holder 106 may be positioned on a track that is movable linearly along the base platform 107. The movable arm 108 may be movable in one, two, or three axes to position the one or more ultrasonic discharge nozzles 102 in a desired position relative to the workpiece holder 106 and the optical substrate(s) 20. Additionally, or in the alternative, the movable arm 108 may be rotatable about one, two, or three axes. In this manner, the movable arm 108 may have up to six degrees of freedom (translation in three axes and rotation about three axes) to move the ultrasonic discharge nozzle 102 relative to the workpiece holder 106 in order to position the ultrasonic discharge nozzle 102 in a predetermined position relative to the optical substrate 20. The movable arm 108 may be moved manually, or its movement may be controlled by one or more motors in electronic communication with a controller. The movement of the movable arm 108 may be predetermined, such as by computer-executable instructions executed by a controller.

In some examples, the workpiece holder 106 may be movable with up to six degrees of freedom, while the one or more ultrasonic discharge nozzles 102 is held stationary. In some aspects, the workpiece holder 106 and the movable arm 108 may be movable with up to six degrees of freedom. In examples having more than one ultrasonic discharge nozzle 102, each ultrasonic discharge nozzle 102 may be movable independently of any other ultrasonic discharge nozzle 102 with up to six degrees of freedom. An uncoated optical substrate 20 may be loaded into the workpiece holder 106 prior to coating the surface of the optical substrate 20 using the one or more ultrasonic discharge nozzles 102. The coated optical substrate 20 may then be removed from the workpiece holder 106 to allow a subsequent, uncoated optical substrate 20 to be loaded. In some examples, a plurality of workpiece holders 106 (not shown) may be provided on a continuously moving base 107 such that a plurality of optical substrates 20 may be coated in a continuous process.

Each ultrasonic discharge nozzle 102 is in fluid communication with a storage reservoir 110. Fluid from the storage reservoir 110 may be delivered to the ultrasonic discharge nozzle 102 by one or more pumps, syringes, or other fluid delivery means. When the coating apparatus 100 has more than one ultrasonic discharge nozzle 102, individual storage reservoirs 110 may be provided for each ultrasonic discharge nozzle 102. In some examples, at least two of the plurality of ultrasonic discharge nozzles 102 may be connected to a common storage reservoir 110. Each storage reservoir 110 is configured to store a coating composition 112 to be delivered to the one or more ultrasonic discharge nozzles 102. In this manner, it is possible to deposit a plurality of different coating materials at the same time on a same optical substrate 20 by using a plurality of ultrasonic discharge nozzles 102 to generate various coatings and colors. Thus, the first coating layer 22 and/or the one or more additional coating layers 24 may be formed as a mixture of two or more coating compositions. In one example, a first storage reservoir 110 may store a first coating composition and one or more additional storage reservoirs 110 may each store one or more additional coating compositions to be delivered to the ultrasonic discharge nozzle 102 and be deposited as an atomized mixture of the first coating composition and one or more additional coating compositions. In other examples, the first coating layer 22 and/or the one or more additional coating layers 24 may be formed from a single coating composition applied in one or more successive layers. Various additional devices, such as heaters, mixers, or the like, may be associated with each storage reservoir 110 for preparing the coating material prior to delivery to the one or more ultrasonic discharge nozzles 102. In some examples, viscosity of the coating composition may be controlled, such as by increasing or reducing the viscosity of the coating material in the storage reservoir 110. In another example, heating of the coating composition within the storage reservoir 110 also may be used to control coating viscosity prior to delivering the coating material to the substrate. A preferred viscosity range of a coating composition is from about 5 cps to about 80 cps, preferably from about 30 cps to about 60 cps. Preferred coating compositions desirably include coatings with solvents having a viscosity of about 0.3 cps to about 5 cps.

In some examples, a plurality of ultrasonic discharge nozzles 102 may be arranged in an array. The plurality of ultrasonic discharge nozzles 102 may be arranged parallel to one another in a direction that is angled relative to a direction in which the plurality of ultrasonic discharge nozzles 102 are moved relative to the optical substrate 20. Offsetting the ultrasonic discharge nozzles 102 at an angle allows a complete coverage of optical substrates 20 of various shapes and sizes. In other examples, the ultrasonic discharge nozzles 102 may be arranged linearly next to one another in a direction substantially parallel or perpendicular to the direction in which the ultrasonic discharge nozzles 102 are moved relative to the optical substrate 20. The ultrasonic discharge nozzles 102 may be offset from one another at a distance from a minimum of 0.5 mm to a maximum of 5 mm, preferably from 2 mm to 3 mm. In other examples, a distance between the optical substrate 20 and nozzle of ultrasonic discharge nozzle 102 may be from a minimum of 10 mm to a maximum of 60 mm, preferably from 25 mm to 45 mm.

During the coating process, the coating material, such as the coating material used to apply the first coating layer 22 or the one or more additional coating layers 24 (shown in FIG. 2) may be applied on the optical substrate 20 in a single pass in which the optical substrate 20 is held stationary and the one or more ultrasonic discharge nozzles 102 are moved, or in which the optical substrate 20 is moved and the one or more ultrasonic discharge nozzles 102 are held stationary, or in which both the optical substrate 20 and the one or more ultrasonic discharge nozzles 102 are moved or held stationary. The single pass may be performed using a single ultrasonic discharge nozzle 102 or multiple ultrasonic discharge nozzles 102. In some examples, the coating material may be applied on the optical substrate 20 in two or more passes in which the optical substrate 20 is held stationary and the one or more ultrasonic discharge nozzles 102 are moved, or in which the optical substrate 20 is moved and the one or more ultrasonic discharge nozzles 102 are held stationary, or in which both the optical substrate 20 and the one or more ultrasonic discharge nozzles 102 are moved or held stationary. Two or more passes may be performed using a single ultrasonic discharge nozzle 102 or multiple ultrasonic discharge nozzles 102.

Figure 5:
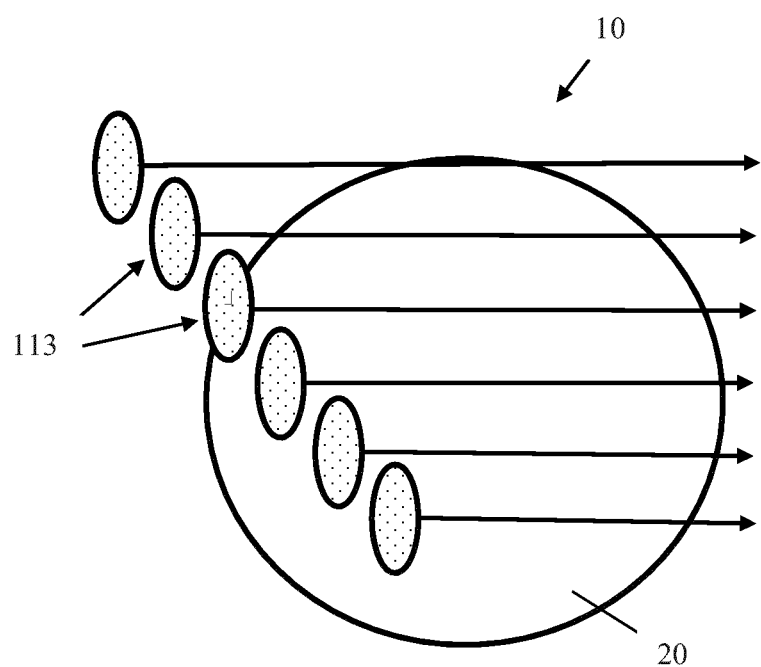
FIG. 5 is a representative top view of an optical article and an exemplary coating pattern made in accordance with a method of the present invention.

With reference to FIG. 5, a spray pattern 113 from one ultrasonic discharge nozzle 102 may at least partially overlap with a spray pattern 113 from at least one additional ultrasonic discharge nozzle 102. The spray patterns 113 may overlap over a minimum of 50% to a maximum of 90%, preferably from 60% to 80% of spray pattern width. In addition, speed and flow rate of each ultrasonic discharge nozzle 102 may be controlled independently. For example, speed at which each ultrasonic discharge nozzle 102 moves may be varied from a minimum of 5 mm/s to a maximum of 80 mm/s, preferably from 45 mm/s to 55 mm/s. In other examples, a flow rate of the coating composition flowing through each ultrasonic discharge nozzle 102 may be varied from a minimum of 0.1 ml/s to a maximum of 0.8 ml/s, preferably from 0.3 ml/s to 0.6 ml/s.

Referring back to FIG. 4, the coating apparatus 100 may have a controller 114 for controlling the operation of the coating apparatus 100. The controller 114 may be configured for controlling the coating operations of the one or more ultrasonic discharge nozzles 102, such as a delivery of one or more coating compositions to the ultrasonic discharge nozzle 102, flow rate of the one or more coating compositions through the ultrasonic discharge nozzle 102, and spray pattern of each ultrasonic discharge nozzle 102. The controller 114 may also control movement operations of the optical substrate 20 and/or the one or more ultrasonic discharge nozzles 102. In addition, the controller 114 may be configured to control the filling and delivery operations of the coating material in the one or more storage reservoirs 110.

In some examples, the controller 114 may include a variety of discrete computer-readable media components for controlling the printing and/or movement operations. For example, this computer-readable media may include any media that can be accessed by the controller 114, such as volatile media, non-volatile media, removable media, non-removable media, transitory media, non-transitory media, etc. As a further example, this computer-readable media may include computer storage media, such as media implemented in any method or technology for storage of information, such as computer-readable instructions, data structures, program modules, or other data; random access memory (RAM), read only memory (ROM), electrically erasable programmable read only memory (EEPROM), flash memory, or other memory technology; CD-ROM, digital video disks (DVDs), or other optical disk storage; magnetic cassettes, magnetic tape, magnetic disk storage, or other magnetic storage devices; or any other medium which can be used to store the desired information and which can be accessed by the controller 114. Further, this computer-readable media may include communications media, such as computer-readable instructions, data structures, program modules, or other data in a modulated data signal, and wireless media (such as acoustic signals, radio frequency signals, optical signals, infrared signals, biometric signals, bar code signals, etc.). Of course, combinations of any of the above should also be included within the scope of computer-readable media.

A user may enter commands, information, and data, such as information relating to an art form file of a desired printed layer, into the controller 114 through certain attachable or operable input devices via a user input interface. Of course, a variety of such input devices may be utilized, e.g., a microphone, a trackball, a joystick, a touchpad, a touchscreen, a scanner, etc., including any arrangement that facilitates the input of data and information to the controller 114 from an outside source. Data and information can be presented or provided to a user in an intelligible form or format through certain output devices, such as a monitor (to visually display this information and data in electronic form), a printer (to physically display this information and data in print form), a speaker (to audibly present this information and data in audible form), etc. It is envisioned that any such output devices can be used to provide information and data to the user.

The controller 114 may operate in a network environment through the use of a communications device, which is integral to the controller 114 or remote therefrom. Using such an arrangement, the controller 114 may connect with or otherwise communicate with one or more remote computers, such as, without limitation, a personal computer, a server, a router, a network personal computer, a peer device, or other common network nodes. Using appropriate communication devices, e.g., a modem, a network interface or adapter, etc., the controller 114 may operate within and communicate through a local area network (LAN) and a wide area network (WAN), but may also include other networks such as a virtual private network (VPN), an office network, an enterprise network, an intranet, the Internet, etc.

As used herein, the controller 114 includes, or is operable to execute appropriate custom-designed or conventional software to perform and implement the processing steps of the method and system of the present disclosure, thereby forming a specialized and particular computing system. Accordingly, the presently-invented method and system may include one or more controllers 114 or similar computing devices having a computer-readable storage medium capable of storing computer-readable program code or instructions that cause a processing unit of the controller 114 to execute, configure, or otherwise implement the methods, processes, and transformational data manipulations discussed herein in connection with the present disclosure. Still further, the controller 114 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

The coating apparatus 100 having one or more ultrasonic discharge nozzles 102 may be used to provide a pattern on a surface of the optical article 10. The pattern may be a pattern that produces a gradual variation in one or more properties of the optical article 10. For example, the gradual variation in hue and/or color density may occur across the surface of the optical article 10 in one direction. For example, when the optical article 10 is a lens, the variation in hue and/or color density can occur from the bottom of the lens to the top of the lens, or vice versa. That is, the deposition of each particular coating composition occurs across the lens from one side to the other and varies in composition or coating thickness such that the variation in hue and/or color density occurs from the bottom to the top, or vice versa.

In some examples, the pattern produced by depositing a mixture of the first coating composition and one or more additional coating compositions using the ultrasonic discharge nozzle 102 may be a gradient pattern, such as a linear gradient pattern, a curvilinear gradient pattern, a radial gradient pattern, or a combination thereof. In various example, the gradient pattern transitions from clear (i.e., no hue) to photochromic, wherein the first coating composition comprises at least one photochromic dye and the one or more additional coating compositions comprise no dye. In further examples, the gradient pattern transitions from photochromic of one hue to photochromic of another hue. In other examples, the gradient pattern transitions from fixed tint to photochromic, wherein the first coating composition comprises at least one photochromic dye and the one or more additional coating compositions comprise a fixed tint dye.

In various examples, the gradient pattern may be formed by controlling a flow rate of the first coating composition through the first liquid channel 122 relative to a flow rate of the one or more additional coating compositions through the second liquid channel 124. In some examples where at least one of the first coating composition and the second coating composition has a photochromic coating composition, controlling the flow rate of the first coating composition relative to the flow rate of the one or more additional coating compositions varies a concentration of the photochromic coating composition in the mixture. In other examples, the gradient pattern may be formed by varying a thickness of the mixture on the optical article 10, such as by forming a thicker coating layer on a first portion of the optical article 10 relative to a thickness of a second portion of the optical article 10.

[Pre-Treatment Step]

In the method for producing the optical article 10 in accordance with the present disclosure, the optical substrate 20 may be subjected to a pre-treating step prior to coating the optical substrate 20 with the first coating layer 22. In this pre-treating step, at least a portion of the optical substrate 20 may be subjected to a corona treatment. Pre-treatments may include, without limitation, plasma, flame, chemical (e.g. caustic) or any treatment for raising the surface energy of the substrate so that the first coating wets the optical substrate and promotes adhesion to the optical substrate. For example, the optical substrate may be treated with a corona discharge from a Tantec EST-Electrical Service Treatment unit operating at 500 Watts and 54 kVA for 30 to 90 seconds to activate the surface of the substrate, as described in U.S. Pat. No. 8,608,988.

[Curing Step]

In the method for producing the optical article 10 in accordance with some examples of the present disclosure, the first coating layer 22 and/or one or more additional coating layers 24 may be cured, such as by heating or exposure to radiation such as ultraviolet (UV) radiation. In various other examples, the curing step may include, in addition or in the alternative to the heating and radiation treatments described herein, exposing at least a portion of the first coating layer 22 and/or one or more additional coating layers 24 to electron beam radiation, microwave radiation, or other methods for curing the coating composition.

Coating Layer Examples

Coating compositions that can be used to form the one or more layers of the first coating layer 22 and one or more additional coating layers 24 include, with some examples, a curable resin composition, and optionally, a solvent. The coating compositions can be in the form of art-recognized liquid coating compositions and powder coating compositions. The coating compositions can be thermoplastic, radiation curable such as by ultraviolet radiation or electron beam, or thermosetting coating compositions. With some examples, the coating compositions are selected from curable or thermosetting coating compositions.

Examples of curable resin compositions that can be used with the curable coating compositions include, but are not limited to: curable resin compositions that include an epoxide functional polymer, such as (meth)acrylic polymers containing residues of glycidyl (meth)acrylate, and an epoxide reactive crosslinking agent (e.g., containing active hydrogens, such as hydroxyls, thiols and amines); curable resin compositions that include active hydrogen functional polymer, such as hydroxy functional polymer, and capped (or blocked) isocyanate functional crosslinking agent; curable resin compositions that include active hydrogen functional polymer, such as hydroxy functional polymer, and melamine crosslinking agent; curable polysiloxane coating compositions; and radiation curable compositions that include acrylic functional monomers. Further examples of suitable curable coating compositions are those described herein below as art-recognized hard coat materials.

Vinyl polymers having hydroxy functionality can be prepared by free radical polymerization methods that are known to those of ordinary skill in the art. With some examples of the present invention, the hydroxy functional vinyl polymer is prepared from a majority of (meth)acrylate monomers and is referred to herein as a "hydroxy functional (meth)acrylic polymer".

Hydroxy functional polyesters useful in curable coating compositions that include capped isocyanate functional crosslinking agents can be prepared by art-recognized methods. Typically, diols and dicarboxylic acids or diesters of dicarboxylic acids are reacted in a proportion such that the molar equivalents of hydroxy groups are greater than that of carboxylic acid groups (or esters of carboxylic acid groups) with the concurrent removal of water or alcohols from the reaction medium.

Hydroxy functional urethanes can be prepared by art-recognized methods. Typically, one or more difunctional isocyanates are reacted with one or more materials having two active hydrogen groups (e.g., diols or dithiols), such that the ratio of active hydrogen groups to isocyanate groups is greater than 1, as is known to the skilled artisan.

"Capped (or blocked) isocyanate crosslinking agent" means a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are typically capable of reacting and forming substantially permanent covalent bonds with the active hydrogen groups of the active hydrogen functional polymer (e.g., with the hydroxy groups of a hydroxy functional polymer).

It is desirable that the capping group of the capped isocyanate crosslinking agent not adversely affect the curable coating composition upon decapping from the isocyanate (i.e., when it becomes a free capping group). For example, it is desirable that the free capping group neither become trapped in the cured film as gas bubbles nor excessively plasticize the cured film. Capping groups useful in the present invention typically have the characteristics of being nonfugitive or capable of escaping substantially from the forming coating prior to its vitrification. Typically, the free capping groups escape substantially from the forming (e.g., curing) coating prior to its vitrification.

Classes of capping groups of the capped isocyanate crosslinking agent can be selected from, but are not limited to: hydroxy functional compounds, e.g., linear or branched $C_2$-$C_8$ alcohols, ethylene glycol butyl ether, phenol and p-hydroxy methylbenzoate; 1H-azoles, e.g., 1H-1,2,4-triazole and 1H-2,5-dimethyl pyrazole; lactams, e.g., e-caprolactam and 2-pyrolidinone; ketoximes, e.g., 2-propanone oxime and 2-butanone oxime. Other suitable capping groups include, but are not limited to, morpholine, 3-aminopropyl morpholine, 3,5-dimethylpyrazole, and N-hydroxy phthalimide.

The isocyanate or mixture of isocyanates of the capped isocyanate crosslinking agent has two or more isocyanate groups (e.g., 3 or 4 isocyanate groups). Examples of suitable isocyanates that can be used to prepare the capped isocyanate crosslinking agent include, but are not limited to monomeric diisocyanates, e.g., α, α'-xylylene diisocyanate, α, α, α', α'-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet or allophanate linkages, e.g., the trimer of IPDI.

The capped isocyanate crosslinking agent can also be selected from oligomeric capped isocyanate functional adducts. As used herein, "oligomeric capped polyisocyanate functional adduct" means a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared (e.g., "TMP-3IPDI"). The three free isocyanate groups per TMP-3IPDI adduct are then capped with a capping group, e.g., a linear or branched $C_2$-$C_8$ alcohol.

To catalyze the reaction between the isocyanate groups of the capped polyisocyanate crosslinking agent and the hydroxy groups of the hydroxy functional polymer, one or more catalysts are typically present in the curable photochromic coating composition in amounts of from, for example, 0.1 to 5 percent by weight, based on total resin solids of the composition. Classes of useful catalysts include but are not limited to, metal compounds, in particular, organic tin compounds, e.g., tin(II) octanoate and dibutyltin (IV) dilaurate, tertiary amines, e.g., diazabicyclo[2.2.2]octane, bismuth, and zinc and zirconium carboxylates.

Curable coating compositions that can be used to form one or more layers of the first coating layer 22 and one or more additional coating layers 24, which include hydroxy functional polymer and capped isocyanate functional crosslinking agent, typically have present therein hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the curable resin composition in an amount corresponding to the balance of these recited ranges, i.e., 5 to 45, particularly 10 to 25, percent by weight.

With the curable urethane resin compositions that can be used to form one or more layers of the first coating layer 22 and one or more additional coating layers 24, the equivalent ratio of isocyanate equivalents in the capped isocyanate crosslinking agent to hydroxy equivalents in the hydroxy functional polymer is typically within the range of 1:3 to 50:1, e.g., 1:2 to 20:1. Curable coating compositions that include hydroxy functional polymer and capped isocyanate functional crosslinking agent are typically cured at a temperature of from 120° C. to 190° C. over a period of from 10 to 60 minutes.

The curable resin composition of the curable coating compositions according to various examples that can be used to form one or more layers of the first coating layer 22 and one or more additional coating layers 24 include: a first reactant (or component) having functional groups, and a second reactant (or component) that is a crosslinking agent having functional groups that are reactive towards and that can form covalent bonds with the functional groups of the first reactant. In some examples, the first coating composition comprises one or more first reactive groups selected from isocyanate and epoxy, while the one or more additional coating compositions comprise a second reactive group selected from the group consisting of hydroxyl, thiol, primary amine, secondary amine, carbamate, and carboxylic acid. In other examples, the first coating composition comprises an isocyanate first reactive group, and the one or more additional coating compositions comprise an hydroxyl second reactive group. In further examples, the first coating composition comprises an epoxy first reactive group, and the one or more additional coating compositions comprise a carboxylic acid second reactive group. The coating composition comprising the first coating composition and the one or more additional coating compositions may have a ratio between 0.3:1 and 50:1 of the first reactive group in the first coating composition and the second reactive group in the one or more additional coating compositions. The first and second reactants of the curable resin composition can each independently include one or more functional species, and are each present in amounts sufficient to provide cured coatings having a desirable combination of physical properties, e.g., smoothness, optical clarity, solvent resistance and hardness.

Coating compositions that can be used to form one or more layers of the first coating layer 22 and one or more additional coating layers 24 can, with some examples, optionally further include a solvent. Examples of suitable solvents include, but are not limited to, acetates, alcohols, ketones, glycols, ethers, aliphatics, cycloaliphatics and aromatics. Examples of acetates include, but are not limited to, ethyl acetate, butyl acetate, and glycol acetate. Examples of ketones include, but are not limited to, methyl ethyl ketone and methyl-N-amyl ketone. Examples of aromatics include, but are not limited to, toluene, naphthalene and xylene. In an example, one or more solvents are added to each of the first reactant and the second reactant. Suitable solvent blends can include, for example, one or more acetates, propanol and its derivatives, one or more ketones, one or more alcohols and/or one or more aromatics. If present, the solvent is typically present in an amount of from 5 to 60 percent by weight, or 5 to 40 percent by weight, or 10 to 25 percent by weight, based on the total weight of the coating composition (inclusive of the solvent weight).

With some examples, the curable resin composition of the coating compositions that can be used to form one or more layers of the first coating layer 22 and one or more additional coating layers 24 is a curable urethane (or polyurethane) resin composition. Curable urethane resin compositions useful in forming one or more layers of the first coating layer 22 and one or more additional coating layers 24 include: an active hydrogen functional polymer, such as a hydroxy functional polymer; and a capped (or blocked) isocyanate functional crosslinking agent. Hydroxy functional polymers that can be used in such compositions include, but are not limited to, art-recognized hydroxy functional vinyl polymers, hydroxy functional polyesters, hydroxy functional polyurethanes and mixtures thereof.

Curable coating compositions that can be used to form one or more layers of the first coating layer 22 and one or more additional coating layers 24, with some examples, can include kinetic enhancing additives, photoinitiators, and thermal initiators. With some examples, the curable coating compositions optionally contain additives for flow and wetting, flow control agents, e.g., poly(2-ethylhexyl)acrylate, adjuvant resin to modify and optimize coating properties, antioxidants, and ultraviolet (UV) light absorbers. Examples of useful antioxidants, hindered amine light stabilizers and UV light absorbers include those available commercially from BASF under the trademarks IRGANOX and TINUVIN. These optional additives, when used, are typically present in amounts up to 10 percent by weight (e.g., from 0.05 to 5 percent by weight), based on total weight of resin solids of the curable resin composition.

With some examples, one or more layers of the first coating layer 22 and one or more additional coating layers 24 can each independently include a static dye, a photochromic material, or a combination thereof. Alternatively or additionally, the optical substrate 20 of the optical article 10 of the present invention can include a static dye, a photochromic material, or a combination thereof. The following description with regard to static dyes and photochromic compounds that can, with some examples, be present in one or more layers of the first coating layer 22 and one or more additional coating layers 24, is also applicable to static dyes and photochromic compounds that can, with some examples, be alternatively or additionally present in the optical substrate of the optical article 10 of the present invention.

Classes and examples of static dyes that can be present in one or more layers of the first coating layer 22 and one or more additional coating layers 24 include, but are not limited to, art-recognized inorganic static dyes and organic static dyes.

Classes of photochromic compounds that can be present in one or more layers of the first coating layer 22 and one or more additional coating layers 24 include, but are not limited to, "conventional photochromic compounds." As used herein, the term "conventional photochromic compound" includes both thermally reversible and non-thermally reversible (or photo-reversible) photochromic compounds. Generally, although not limiting herein, when two or more conventional photochromic materials are used in combination with each other, the various materials can be chosen to complement one another to produce a desired color or hue. For example, mixtures of photochromic compounds can be used according to certain non-limiting examples disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

Examples of photochromic materials or compounds that can be present in one or more layers of the first coating layer 22 and one or more additional coating layers 24 include, but are not limited to, indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Further examples of photochromic compounds, that can be present in one or more layers of the first coating layer 22 and one or more additional coating layers 24, can, with some examples, be selected from certain indeno-fused napthopyran compounds, such as described in U.S. Pat. No. 6,296,785, at column 3, lines 66 through column 10, line 51, which disclosure is incorporated herein by reference.

The photochromic compounds, with some examples, that can be present in one or more layers of the first coating layer 22 and one or more additional coating layers 24, can be covalently bonded to the matrix, such as the organic matrix, of any layer. With some examples, the photochromic compounds can include one or more reactive groups, such as one or more polymerizable groups. With some examples, the photochromic compounds can be selected from 2H-naphtho[1,2-b]pyrans, 3H-naphtho[2,1-b]pyrans and/or indeno[2,1-f]naphtho[1,2-b]pyrans each having at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group. Examples of such photochromic compounds include, but are not limited to, those disclosed in U.S. Pat. No. 6,113,814, at column 2, line 52 through column 8, line 40, which disclosure is incorporated herein by reference.

The photochromic compounds can be introduced into a particular film, layer, or optical substrate in accordance with art-recognized methods. Such art-recognized methods include, but are not limited to, imbibition, and incorporating the photochromic compounds into a composition from which the particular film, layer or optical substrate is prepared.

The photochromic compounds can be present in one or more layers of the first coating layer 22 and one or more additional coating layers 24, and/or the optical substrate, in amounts (or ratios) such that the optical element of the present disclosure exhibits desired optical properties. For purposes of non-limiting illustration, the amount and types of photochromic compounds can be selected such that the optical element is clear or colorless when the photochromic compounds are in the closed-form (e.g., in the bleached or unactivated state), and can exhibit a desired resultant color when the photochromic compounds are in the open-form (e.g., when activated by actinic radiation). The precise amount of the photochromic compounds that are utilized is not critical, provided that a sufficient amount is used to produce the desired effect. The particular amount of the photochromic compounds used can depend on a variety of factors, such as but not limited to, the absorption characteristics of the photochromic compounds, the color and intensity of the color desired upon activation, and the method used to incorporate the photochromic compounds into a particular layer. Although not limiting herein, according to various non-limiting examples disclosed herein, the amount of the photochromic compounds that are incorporated into a layer of the optical element can range from 0.01 to 40 weight percent, or from 0.05 to 15, or from 0.1 to 5 weight percent, based on the weight of the layer. The same amounts and ranges are applicable with regard to the amount of the photochromic compounds that are alternatively or additionally incorporated into the optical substrate of the optical element of the present disclosure.

The optical elements prepared by the method of and according to the present disclosure can optionally include one or more layers in addition to the first coating layer 22 and one or more additional coating layers 24. Examples of such additional layers include, but are not limited to: primer coatings and films; protective coatings and films, including transitional coatings and films and abrasion resistant coatings and films; anti-reflective coatings and films; polarizing coatings and films; and combinations thereof. As used herein the term "protective coating or film" refers to coatings or films that can prevent wear or abrasion, provide a transition in properties from one coating or film to another, protect against the effects of polymerization reaction chemicals, and/or protect against deterioration due to environmental conditions such as moisture, heat, ultraviolet light, oxygen, etc.

As used herein, the term "transitional coating and film" means a coating or film that aids in creating a gradient in properties between two coatings or films, or a coating and a film. For example, although not limiting herein, a transitional coating can aid in creating a gradient in hardness between a relatively hard coating and a relatively soft coating. Non-limiting examples of transitional coatings include radiation-cured, acrylate-based thin films as described in U.S. Pat. No. 7,452,611 B2, which are hereby specifically incorporated by reference herein.

As used herein the term "abrasion resistant coating and film" refers to a protective polymeric material that demonstrates a resistance to abrasion that is greater than a standard reference material, e.g., a polymer made of CR39® monomer available from PPG Industries, Inc, as tested in a method comparable to ASTM F-735 Standard Test Method for Abrasion Resistance of Transparent Plastics and Coatings Using the Oscillating Sand Method. Non-limiting examples of abrasion resistant coatings include, for example, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT™ 124 and HI-GARD® coatings, available from SDC Coatings, Inc. and PPG Industries, Inc., respectively.

The abrasion resistant coating or film (or hard coat layer) can, with some examples, be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156, and International Patent Publication WO 94/20581 for disclosures of organo-silane hard coatings, which disclosures are also incorporated herein by reference. The hard coat layer can be applied by art-recognized coating methods such as, but not limited to, roll coating, spray coating, curtain coating, and spin coating.

Non-limiting examples of antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc. Non-limiting examples of conventional photochromic coatings and films include, but are not limited to, coatings and films comprising conventional photochromic materials.

In various examples, the first coating layer 22 and one or more additional coating layers 24 can each independently have a single layered film or a multilayered film interposed between the first coating layer 22 and the optical substrate 20, and/or between the first coating layer 22 and the one or more additional coating layers 24, and/or between adjacent additional coating layers 24. In each case, the film may be selected from thermoplastic films, crosslinked films, and combinations thereof. Each film can be independently formed from a polymeric sheet or a coating composition.

Examples of polymeric materials that can be used in forming one or more films include, but are not limited to: polyvinyl alcohol, polyvinyl chloride, polyurethane, polyimide, polyacrylate, and polycaprolactam. With some examples, one or more polymeric sheet can be at least partially ordered, for example, by unilateral or bilateral stretching.

Coating Process Examples

A T7 Grey coating solution, available from Transitions Optical, Inc. of Pinellas Park, Florida, was mixed with methyl isobutyl ketone (MIBK) solvent in a 2:1 ratio. A Sontek Syringe Pump (Part No. 12-05-00144) was filled with this photochromic solution and installed on a Sono-Tek Flexicoat Ultrasonic Spray coater, available from Sono-Tek Corporation of Milton, New York (Part No. W6152).

In addition, the T7 coating containing all components except for the photochromic dye was mixed with MIBK solvent in a 2:1 ratio. This clear coating was used to fill a separate Sonotek Syringe Pump on the same coater.

Samples of 76 mm CR39™ mid-base substrate lens, available from PPG Industries, Inc. of Pittsburgh, PA, were cleaned using isopropyl alcohol (IPA) solvent and then surface treated using a Tantec Lab corona system Model HT-X1-28-02. Each treated lens was placed in the coating chamber of the Sono-Tek Flexicoat Ultrasonic Spray coater.

The coating was applied to each lens using a Sonotek 120 kHz Impact style ultrasonic nozzle, available from Sono-Tek Corporation of Milton, New York (S/N 120-01473), with a power setting at 5.5 Watts. The speed of the nozzle was set at 30 mm/sec, with the nozzle positioned 35 mm above the center of the lens. The flow rate of the photochromic coating was set to 0.6 mls/min. The area spacing, or the offset distance of the nozzle in subsequent passes over the lens, was set at 2 mm. The air shaping pressure used to direct the atomized coating onto the lens was set at 3 psi.

In Example 1, the photochromic coating was applied in an area pattern over the top half of the lens. At the mid-point of the lens, the clear coating is applied to the remainder of the lens using the same process parameters. The photochromic and clear coatings blend at the mid-point of the lens providing a short gradient from photochromic to clear coating.

In Example 2, the photochromic coating was applied in an area pattern over the top third of the lens. As the nozzle approached the second third of the lens, the clear coating was fed to the nozzle, such that the second third of the lens was coated with a mix of 50% photochromic coating and 50% clear coating using the same process parameters as for the first example. When the nozzle reached the final third of the lens, feed of the photochromic coating was discontinued such that only the clear coating was applied.

In Example 3, the photochromic coating was applied in an area pattern over the top quarter of the lens. As the nozzle approached the second quarter of the lens, the clear coating was fed to the nozzle, such that the second quarter of the lens was coated with a mix of 66% photochromic coating and 33% clear coating using the same process parameters as for the first example. When the nozzle approached the third quarter of the lens, the clear coating feed was increased and the photochromic coating feed was reduced, such that the third quarter of the lens was coated with a mix of 33% photochromic coating and 66% clear coating. When the nozzle approached the final quarter of the lens, feed of the photochromic coating was discontinued such that only the clear coating was applied.

The coated lenses from each example were then placed in a Memmert UN 55 thermal oven (Part No. B214.1731) for a period of 60 minutes at a temperature of 120= C. The lenses were subsequently placed on a transbonding line for the application of a tie layer and a HIGARD™ 1080 thermally cured hardcoat, available from PPG Industries, Inc. of Pittsburgh, PA.

Figure 6:
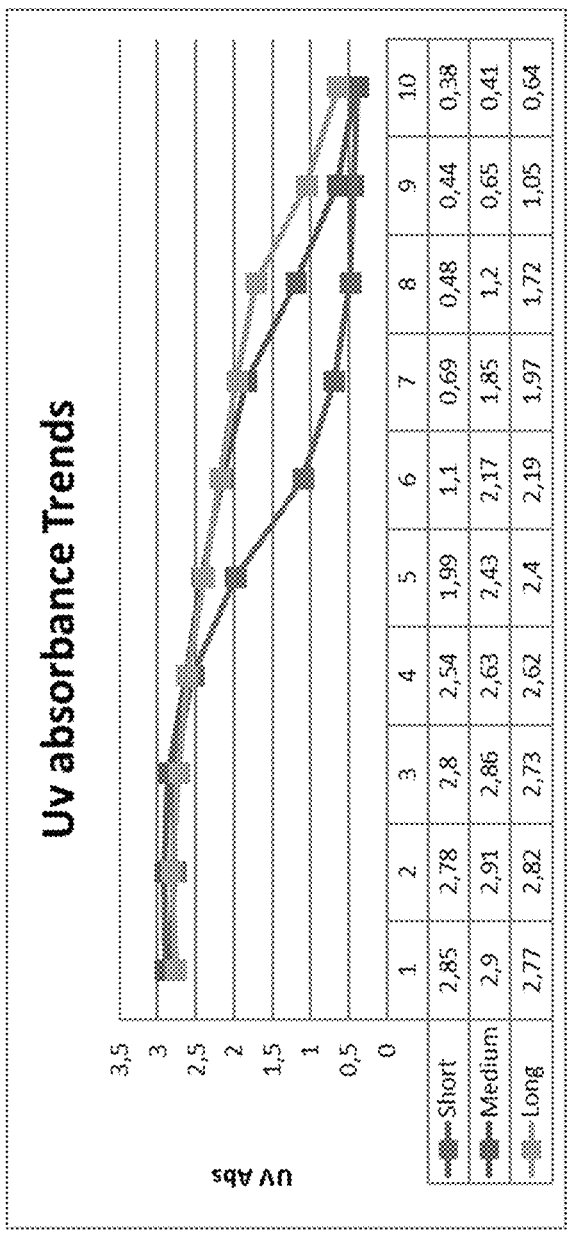
FIG. 6 is a graph showing UV absorbance trends of various examples discussed herein.

The lenses from each example were subsequently measured for UV absorbance at a wavelength of 390 nm using the Cary 300 Conc UV visible spectrophotometer model number EL08023601, available from Agilent Technologies of Santa Clara, CA. Measurements were taken down the face of the lens starting at the 12 o'clock position and finishing at the 6 o'clock position in 10 equal spacings. The absorbance value is proportional to the concentration of photochromic dye and the resultant outdoor activated % transmission. The drop in UV absorbance down the lens quantifies the activated gradient properties of the lens. The absorbance results are listed in FIG. 6, with the "Short", "Medium", and "Long" referring to Example 1, Example 2, and Example 3, respectively.

In various examples, the present invention may be further characterized by one or more of the following clauses:

Clause 1. A method of manufacturing an optical article, the method comprising:
supplying a first coating composition to an ultrasonic discharge nozzle of a coating apparatus;
supplying one or more additional coating compositions to the ultrasonic discharge nozzle of the coating apparatus, at least one of the first coating composition and the one or more additional coating compositions being a photochromic coating composition;
mixing the first coating composition and the one or more additional coating compositions at the ultrasonic discharge nozzle of the coating apparatus; and
applying the mixture of the first coating composition and the one or more additional coating compositions to at least a portion of the optical article so as to provide a pattern on the optical article upon exposure to actinic radiation,
wherein the mixture of the first coating composition and the one or more additional coating compositions is applied from the ultrasonic discharge nozzle as a controlled, predetermined pattern of atomized droplets.

Clause 2. The method of clause 1, wherein the pattern is a gradient pattern.

Clause 3. The method of clause 2, wherein the gradient pattern is linear, curvilinear, radial, or a combination thereof.

Clause 4. The method of clauses 2 or 3, wherein the gradient pattern is linear.

Clause 5. The method of any of clauses 2-4, wherein the gradient pattern is formed by controlling a flow rate of the first coating composition relative to a flow rate of the one or more additional coating compositions.

Clause 6. The method of clause 5, wherein controlling the flow rate of the first coating composition relative to the flow rate of the one or more additional coating compositions varies a concentration of the photochromic coating composition in the mixture.

Clause 7. The method of any of clauses 2-4, wherein the gradient pattern is formed by varying a thickness of the mixture on the optical article.

Clause 8. The method of any of clauses 1-6, wherein the mixture of the first coating composition and the one or more additional coating compositions is applied on the optical article as a coating having uniform thickness.

Clause 9. The method of any of clauses 1-6, wherein the mixture of the first coating composition and the one or more additional coating compositions is applied on the optical article as a coating having non-uniform thickness.

Clause 10. The method of any of clauses 1-9, wherein the mixture of the first coating composition and the one or more additional coating compositions is applied on the optical article in a single pass.

Clause 11. The method of any of clauses 1-9, wherein the mixture of the first coating composition and the one or more additional coating compositions is applied on the optical article in multiple passes.

Clause 12. The method of any of clauses 1-11, wherein the one or more additional coating compositions comprise a second reactive group selected from the group consisting of hydroxyl, thiol, primary amine, secondary amine, carbamate, and carboxylic acid.

Clause 13. The method of clause 12, wherein the first coating composition comprises one or more first reactive groups selected from isocyanate and epoxy.

Clause 14. The method of any of clauses 1-13, wherein the first coating composition comprises an isocyanate first reactive group, and the one or more additional coating compositions comprise an hydroxyl second reactive group.

Clause 15. The method of any of clause 1-14, wherein the optical article is selected from the group consisting of optical lenses, optical filters, windows, visors, mirrors and displays, preferably optical lenses, more preferably ophthalmic lenses.

Clause 16. The method of any of clauses 1-15, wherein the ultrasonic discharge nozzle has a frequency of 48-120 kHz.

Clause 17. An optical article obtainable by the method of any of clauses 1-16.

Clause 18. An apparatus for applying material to an optical article, the apparatus comprising:
 a holder for retaining the optical article;
 an ultrasonic discharge nozzle for mixing a first coating composition and one or more additional coating compositions, and applying an atomized mixture of the first coating composition and the one or more additional coating compositions to at least a portion of the optical article;
 means for separately supplying the first coating composition and the one or more additional coating compositions to the ultrasonic discharge nozzle; and
 a controller for positioning at least one of the holder and the ultrasonic discharge nozzle relative to each other prior to applying the atomized mixture to at least a portion of the optical article and to control the coating operation of the ultrasonic discharge nozzle so as to provide a pattern on the optical article upon exposure to actinic radiation.

Clause 19. The apparatus of clause 18, wherein the pattern is a gradient pattern.

Clause 20. The apparatus of clause 19, wherein the gradient pattern is linear, curvilinear, radial, or a combination thereof.

Clause 21. The apparatus of clause 19 or 20, wherein the gradient pattern is linear.

The present invention has been described with reference to specific details of particular examples thereof. It is not intended that such details be regarded as limitations upon the scope of the invention except insofar as and to the extent that they are included in the accompanying claims.

What is claimed is:

1. A method of manufacturing an optical article, the method comprising:
 supplying a first coating composition comprising a first curable resin composition in liquid form to an ultrasonic discharge nozzle of a coating apparatus;
 supplying one or more additional coating compositions comprising one or more additional curable resin compositions in liquid form to the ultrasonic discharge nozzle of the coating apparatus, at least one of the first coating composition and the one or more additional coating compositions is a photochromic coating composition;
 mixing and atomizing the first coating composition and the one or more additional coating compositions at an atomizing surface of the ultrasonic discharge nozzle of the coating apparatus to form an atomized mixture of the first coating composition and the one or more additional coating compositions; and
 applying the atomized mixture of the first coating composition and the one or more additional coating compositions to at least a portion of the optical article so as to provide a gradient pattern on the optical article upon exposure to actinic radiation,
 wherein the atomized mixture of the first coating composition and the one or more additional coating compositions is applied from the ultrasonic discharge nozzle as a controlled, predetermined gradient pattern of atomized droplets,
 wherein the gradient pattern is formed by controlling a flow rate of the first coating composition in liquid form relative to a flow rate of the one or more additional coating compositions in liquid form supplied to the atomizing surface of the nozzle, and
 wherein the first curable resin composition and the one or more additional curable resin compositions comprise an epoxide functional polymer or an active hydrogen functional polymer.

2. The method of claim 1, wherein the gradient pattern is linear, curvilinear, radial, or a combination thereof.

3. The method of claim 1, wherein controlling the flow rate of the first coating composition relative to the flow rate of the one or more additional coating compositions varies a concentration of the photochromic coating composition in the atomized mixture.

4. The method of claim 1, wherein the atomized mixture of the first coating composition and the one or more additional coating compositions is applied on the optical article as a coating having uniform thickness.

5. The method of claim 1, wherein the atomized mixture of the first coating composition and the one or more additional coating compositions is applied on the optical article as a coating having non-uniform thickness.

6. The method of claim 1, wherein the atomized mixture of the first coating composition and the one or more additional coating compositions is applied on the optical article in a single pass or multiple passes.

7. The method of claim 1, wherein when the first curable resin composition or the one or more additional curable resin compositions comprise the epoxide functional polymer, the first curable resin composition or the one or more additional curable resin compositions further comprise an epoxide reactive crosslinking agent comprising active hydrogens, or
 wherein when the first curable resin composition or the one or more additional curable resin compositions comprise the active hydrogen functional polymer, the first curable resin composition or the one or more additional curable resin compositions further comprise a capped isocyanate functional crosslinking agent.

8. The method of claim 1, wherein the optical article is selected from the group consisting of optical lenses, optical filters, windows, visors, mirrors, displays, and ophthalmic lenses.

9. The method of claim 1, wherein the ultrasonic discharge nozzle has a frequency of 48-120 kHz.

* * * * *